United States Patent
Goda et al.

(10) Patent No.: US 8,207,106 B2
(45) Date of Patent: Jun. 26, 2012

(54) METHOD FOR PRODUCING ANION SURFACTANT GRANULES

(75) Inventors: Hisashi Goda, Wakayama (JP); Tatsuki Matsumoto, Wakayama (JP); Toku Fujioka, Wakayama (JP)

(73) Assignee: Kao Corporation, Tokyo (JP)

( * ) Notice: Subject to any disclaimer, the term of this patent is extended or adjusted under 35 U.S.C. 154(b) by 47 days.

(21) Appl. No.: 12/517,998

(22) PCT Filed: Dec. 7, 2007

(86) PCT No.: PCT/JP2007/074072
§ 371 (c)(1),
(2), (4) Date: Jul. 2, 2009

(87) PCT Pub. No.: WO2008/069350
PCT Pub. Date: Jun. 12, 2008

(65) Prior Publication Data
US 2010/0324325 A1     Dec. 23, 2010

(30) Foreign Application Priority Data

Dec. 8, 2006  (JP) ................................. 2006-331485

(51) Int. Cl.
*C11D 17/00* (2006.01)
(52) U.S. Cl. .......... 510/444; 510/445; 510/446; 510/492
(58) Field of Classification Search .................. None
See application file for complete search history.

(56) References Cited

U.S. PATENT DOCUMENTS

| | | |
|---|---|---|
| 2005/0043202 A1 | 2/2005 | Umehara et al. |
| 2005/0170993 A1 * | 8/2005 | Goda et al. ............ 510/446 |

FOREIGN PATENT DOCUMENTS

| | | |
|---|---|---|
| JP | 61-277661 A | 12/1986 |
| JP | 11-5999 A | 1/1999 |
| JP | 2005-68413 A | 3/2005 |
| JP | 2005-239836 A | 9/2005 |
| JP | 2006-57001 A | 3/2006 |

* cited by examiner

*Primary Examiner* — Necholus Ogden Jr.
(74) *Attorney, Agent, or Firm* — Birch, Stewart, Kolasch & Birch, LLP

(57) ABSTRACT

Disclosed is a method for producing an anionic surfactant powder, which comprises a step wherein an aqueous anionic surfactant solution having an anionic surfactant concentration of 0.01-40% by weight is introduced into a granulating machine or a drying machine having a mixing blade under a reduced pressure for granulation and drying.

11 Claims, No Drawings

METHOD FOR PRODUCING ANION SURFACTANT GRANULES

FIELD OF THE INVENTION

The present invention relates to a method for producing anion surfactant granules.

BACKGROUND OF THE INVENTION

Anion surfactants are mixed with other surfactant or a builder to be used in laundry detergents, kitchen detergents, foaming agents for toothpaste, emulsifiers for medicines and cosmetics, other detergents and the like.

There are conventionally known methods for producing relatively high purity anion surfactant powders and particles, including a method of drying to less than 1% by weight of water concentration with a rotary thin film evaporator (JP-A11-5999) and a method of producing an anion surfactant dry powder with a spray drying tower with simultaneously reducing unreacted alcohols (JP-A61-277661).

JP-A2005-68413 describes a method for drying that uses a smaller drying apparatus and loads a smaller drying load than those of JP-A11-5999 and JP-A61-277661, and can be performed at low temperature to cause little heat deterioration. In this method, a water concentration of an anion surfactant slurry is described to be 20 to 40% by weight, from the viewpoints of reduction in thermal energy load and easiness of handling of a dry slurry.

SUMMARY OF THE INVENTION

The present invention provides a method for producing anion surfactant granules, including adding an aqueous solution of an anion surfactant whose anion surfactant concentration is 0.01 to 40% by weight at a reduced pressure to a granulator or dryer having an agitating blade; and granulating and drying the aqueous solution.

DETAILED DESCRIPTION OF THE INVENTION

However, in the method described in JP-A11-5999, heating is performed through an inner heat conductive wall surface of the rotary thin film evaporator by introducing heated steam or hot water to a heating jacket. To dry an anion surfactant to a water concentration of less than 1% by weight, the inner heat conductive wall surface must be at 110° C. or higher. When an aqueous solution or a slurry of an anion surfactant has a large water concentration, it is in contact with the inner heat conductive wall surface at a very high temperature and hydrolyzation happens to take place. A thermal deterioration of the anion surfactant happens to facilitate when a flow of a raw material to be dried is interrupted on the inner heat conductive wall surface and the raw material is locally heated. Therefore, the reference method have such problems of difficulty of stable operations.

In the method described in JP-A61-277661, drying is performed by blowing hot air at about 180° C. The method thus has problems that it requires very large amounts of heat energy and that it also facilitates thermal deterioration of the anion surfactant adhered to the inner wall of the drying tower, resulting in difficulty of stable operation for a long period.

In the method described in JP-A2005-68413, a water amount to be vaporized is small and it is difficult to reduce unreacted alcohols in drying. A main object of the method is to dry, and there is no description about reduction of unreacted alcohols.

The present invention provides a method for producing anion surfactant granules that uses a versatile granulator or dryer, causes little thermal deterioration and reduces impurities such as unreacted alcohols.

According to the method of the present invention, high purity anion surfactant granules can be produced with little thermal deterioration and reduced impurities such as unreacted alcohols.

The high purity anion surfactant granules produced by the method of the present invention are preferably used in, for example, laundry detergents, kitchen detergents, foaming agents for toothpaste, powders for shampoo, emulsifiers for emulsion polymerization, emulsifiers for medicines and cosmetics, and foaming agents for cement.

[Anion Surfactant]

The anion surfactant used in the present invention is not specifically limited. Examples of the anion surfactant include alkyl- or alkenylsulfates, polyoxyalkylene alkyl or alkenyl ether sulfuric acid salts, α-olefin sulfonate, alkylbenzenesulfonic acid salts, α-sulfofatty acid salts or esters, and alkyl or alkenyl ether carboxylic acid salts. From the viewpoints of foaming properties and washing performances, among them, preferred are alkyl- or alkenylsulfates and polyoxyalkylene alkyl or alkenyl ether sulfuric acid salts, more preferred are alkyl- or alkenylsulfates, and even more preferred are alkylsulfate. Examples of the salt include alkali metal salts, alkaline earth metal salts, ammonium salts and alkanolamine salts. Among these salts, preferred are alkaline metal salts, and more preferred are sodium and potassium salts and mixtures thereof.

Among these anion surfactant, more preferably used is at least one surfactant selected from alkyl- or alkenyl-sulfates represented by the following formula (I) and polyoxyalkylene alkyl or alkenyl ether sulfuric acid salts represented by the following formula (II):

(wherein, $R^1$ represents an liner or branched alkyl or alkenyl group having 8 to 24 carbon atoms; $M^1$ represents a cation; and, p represents a valency of $M^1$, which is the number of 1 or 2.)

(wherein, $R^2$ represents an liner or branched alkyl or alkenyl group having 8 to 24 carbon atoms; A represents an alkylene group having 2 to 4 carbon atoms, wherein m's A may be same or different; m represents an average alkylene oxide addition mole number, which is the number of 0.05 to 20; $M^2$ represents a cation; and, q represents a valency of $M^2$ which is the number of 1 or 2.)

From the viewpoints of caking resistance and solubility of granule, in the formulae (I) and (II), carbon numbers of $R^1$ and $R^2$ each are preferably 8 to 20, and even more preferably 10 to 18. A is preferably an alkylene group having 2 to 4 carbon atoms, and particularly preferably 2 carbon atoms. From the viewpoints of achievement of excellent powder properties and improved caking resistance of granule, m is preferably 0.05 to 2, more preferably 0.1 to 1, and even more preferably 0.2 to 0.8. $M^1$ and $M^2$ each are preferably an alkaline metal atom such as Na and K, an alkaline earth metal atom such as Ca and Mg, or an alkanol-substituted or unsubstituted ammonium group, and more preferably an alkaline metal atom, and even more preferably Na.

The alkyl- or alkenylsulfate represented by the formula (I) can be obtained by, for example, sulfating an alcohol having 8 to 24 carbon atoms and preferably 8 to 20 carbon atoms (hereinafter, referred to as a higher alcohol) and neutralizing.

The polyoxyalkylene alkyl or alkenyl ether sulfuric acid salt represented by the formula (II) can be obtained by, for example, sulfating an alkylene oxide adduct of a higher alcohol, which is prepared by adding the alkylene oxide to the higher alcohol such that an average addition mole number is 0.05 to 20, and preferably 0.05 to 2, and neutralizing.

Sulfation and neutralization can be conducted by a well-known method. A sulfating agent used in the sulfation is preferably sulfur trioxide or chlorosulfonic acid. When a sulfur trioxide gas is used, the gas is generally diluted with an inert gas, preferably dry air or nitrogen to give a gas mixture containing sulfur trioxide at a gas concentration of 1 to 8% by volume, and preferably 1.5 to 5% by volume. Examples of the neutralizing agent include sodium hydroxide, potassium hydroxide and sodium carbonate.

The anion surfactant may contain a water-soluble inorganic salt. In production of high purity anion surfactant granules, from the viewpoint of enhancing purity thereof, an amount of the water-soluble inorganic salt is preferably reduced as small as possible. Representative examples of the water-soluble inorganic salt include sodium chloride, sodium sulfate decahydrate and sodium carbonate.

[Method for Producing Anion Surfactant Granules]

The granulator or dryer used in the method of the present invention preferably includes an agitating blade, a jacket for controlling an inner temperature (material temperature), and a nozzle for introducing a carrier gas. For more preferred granulator, specific examples include those described in JP-A10-296064, JP-A10-296065 and JP-133165700.

The granulator or dryer may further include a crushing blade. The crushing blade appropriately crushes anion surfactant granules to increase a relative surface area thereof, resulting in increased contact effect to a carrier gas, and thereby impurities can be removed effectively.

The granulator or dryer preferably used in the present invention include, for a batch type, a Henschel mixer (manufactured by Mitsui Miike Kakouki Kabusiki Kaisha), a high-speed mixer (manufactured by Fukae Powtec Co., Ltd.), a vertical granulator (manufactured by Powrex Corporation), a Loedige mixer (manufactured by Matsuzaka Giken Kabusiki Kaisha), a Ploughshare mixer (manufactured by Pacific Machinery & Engineering Co., Ltd.). Among them, particularly preferred are a Loedige mixer (manufactured by Matsuzaka Giken Kabusiki kaisha), a high-speed mixer (manufactured by Fukae Powtec Co., Ltd.), and a Ploughshare mixer (manufactured by Pacific Machinery & Engineering Co., Ltd.). The granulator or dryer also include, for a continuous type, a continuous Loedige mixer (moderate speed mixer: relatively long resident time); and for a high speed mixer (relatively short resident time), a CB recycler (manufactured by Loedige), Turbulizer (manufactured by Hosokawa Micron Corporation), a Schugi mixer (manufactured by Powrex Corporation), and a Flow-jet mixer (manufactured by Funken kabusiki kaisya).

In the present invention, an internal pressure of the granulator or dryer is reduced to preferably not more than 50 kPa, more preferably not more than 30 kPa, even more preferably not more than 20 kPa, and even more preferably not more than 10 kPa, from the viewpoint of acceleration of dehydration speed. From the viewpoints of load on a vacuum pump and air tightness of the granulator, the internal pressure is preferably not less than 0.5 kPa, more preferably not less than 1.5 kPa, even more preferably not less than 2.0 kPa, and even more preferably not less than 3.0 kPa.

In the present invention, an anion surfactant concentration in an anion surfactant aqueous solution added to the granulator or dryer is not less than 0.01% by weight, preferably not less than 0.1% by weight, more preferably not less than 1% by weight, and even more preferably not less than 5% by weight, from the viewpoint of productivity. From the viewpoint of removal of impurity, the concentration is not more than 40% by weight, preferably not more than 35% by weight, and even more preferably not more than 30% by weight.

In the present invention, an anion surfactant powder preferably presents in the granulator or dryer before an anion surfactant aqueous solution is added thereto, in other words, the anion surfactant powder is preferably pre-charged in the granulator or dryer, from the viewpoint of prevention of adhesion to the inner wall of the granulator or dryer. From the viewpoint of prevention of adhesion to the inner wall of the granulator or dryer, a pre-charged amount of the anion surfactant powder to a final amount of the anion surfactant granules produced is preferably not less than 1% by weight, more preferably not less than 5% by weight, and even more preferably not less than 10% by weight. From the viewpoint of productivity, the pre-charged amount is preferably not more than 50% by weight, more preferably not more than 40% by weight, and even more preferably not more than 30% by weight.

In the present invention, an adding rate of the anion surfactant aqueous solution is preferably not less than 1 kg/Hr, more preferably not less than 5 kg/Hr, and even more preferably not less than 10 kg/Hr, per 1 $m^3$ of inner volume of the granulator or dryer, from the viewpoint of productivity. From the viewpoint of prevention of adhesion of the anion surfactant to the inner wall of the granulator or dryer, the adding rate is preferably not more than 200 kg/Hr, more preferably not more than 100 kg/Hr, and even more preferably not more than 50 kg/Hr.

When the anion surfactant powder is not pre-charged, the adding rate of the anion surfactant aqueous solution is preferably 0.01 to 50 kg/Hr. When the anion surfactant powder is pre-charged in the granulator or dryer, the adding rate of the anion surfactant aqueous solution per 1 kg of anion surfactant powder in the granulator or dryer is preferably not less than 0.01 kg/Hr, more preferably not less than 0.05 kg/Hr, and even more preferably not less than 0.1 kg/Hr, from the viewpoint of productivity. From the viewpoint of prevention of adhesion of the anion surfactant to the inner wall of the granulator or dryer, the adding rate is preferably not more than 100 kg/Hr, more preferably not more than 50 kg/Hr, and even more preferably not more than 30 kg/Hr.

In the present invention, a temperature of the anion surfactant granule in the granulator or dryer is preferably not more than 60° C., more preferably not more than 55° C., and even more preferably not more than 50° C., from the viewpoint of prevention of thermal deterioration. From the viewpoint of increased distilling rate of impurity, the temperature is preferably not less than 5° C., more preferably not less than 30° C., and even more preferably not less than 35° C.

Examples of a method for controlling a temperature of the anion surfactant granules in the granulator or dryer include appropriately controlling a jacket temperature in the granulator and a Froude number of the agitating blade of the granulator and the like.

Examples of a heat source of the granulator include a hot water jacket and an electric tracing. Preferred is a hot water jacket. A temperature of a jacket is preferably not more than 100° C., more preferably not more than 90° C. from the viewpoint of applicability to heat-sensitive materials, and even more preferably not more than 70° C. From the viewpoint of use as a heat source, the temperature is preferably not less than 30° C., more preferably not less than 40° C., and even more preferably not less than 50° C.

In the present invention, agitation heat can be controlled by changing a rotation number of the agitating blade of the granulator or dryer. From the viewpoint of suppression of agitation heat to prevent excess elevation of a temperature of the anion surfactant granules in the granulator or dryer, the Froude number defined by the following formula is preferably not more than 5.0, and more preferably not more than 2.3. From the viewpoint of sufficient agitation of the anion surfactant granules in the granulator or dryer to facilitate contact with a carrier gas, the Froude number is preferably not less than 0.3, and more preferably not less than 0.9.

$$Fr=V/[(R \times g)^{0.5}]$$

(wherein, Fr represents the Froude number; V represents a peripheral velocity of the agitating blade at the tip (m/sec.); R represents a radius of rotation (m) of the agitating blade; and g represents the gravitational acceleration (m/sec$^2$)).

An average particle diameter of the anion surfactant granules obtained by the present invention is preferably not less than 0.1 mm, more preferably not less than 0.15 mm, and even more preferably not less than 0.2 mm, from the viewpoints of improved fluidity in the granulator or dryer and prevention of adhesion to the wall thereof and a filter cloth. From the viewpoint of removal efficiency of impurity, the average particle diameter is preferably less than 3.0 mm, more preferably not more than 2.5 mm, and even more preferably not more than 2.0 mm. In the present invention, an average particle diameter of the anion surfactant granules is calculated from weight percentages on JIS Z 8801 standard sieves of different mesh sizes after five minutes shaking.

The anion surfactant granules of the present invention may further contain a water-soluble inorganic salt in addition to the anion surfactant. Examples of the water-soluble inorganic salt include sodium chloride, sodium sulfate decahydrate and sodium carbonate. A content of the water-soluble inorganic salt in the anion surfactant granules of the present invention is not specifically limited, but preferably not more than 5 parts by weight, preferably not more than 2 parts by weight, more preferably not more than 1 parts by weight, and even more preferably not more than 0.5 parts by weight per 100 parts by weight of anion surfactant, from the viewpoint of keeping an anion active matter of the anion surfactant high.

In the present invention, impurities in a surfactant refer petroleum ether-soluble matters of the surfactant. Examples of the petroleum ether-soluble matter include unsulfated alcohols and alkoxylates in production of anion surfactant, and a trace amount of by-products including hydrocarbons and wax. An amount of the petroleum ether-soluble matters is determined by dissolving 100 g of sample in a mixture of 200 ml each of water and ethanol, extracting with sufficient amount of petroleum ether, distilling petroleum ether off from the extract in a water bath at 60° C. to almost free from petroleum ether, blowing the air to completely remove petroleum ether, drying the residual extract for 15 minutes at 85° C. in a dryer, and dividing a weight of the extract by a weight of the sample.

The anion surfactant granules of the present invention may contain other surfactant than the anion surfactant. Examples of the other surfactant than the anion surfactant include cation and nonionic surfactants.

The anion surfactant granules of the present invention may further contain additives according to need. Examples of the additive include alkali agents such as silicates and carbonates, divalent metal ion scavengers such as citrate and zeolite, anti-resoiling agents such as polyvinylpyrrolidone and carboxy methyl cellulose, anti-caking agents and antioxidants. These additives can be used within the range that does not inhibit the object of the present invention.

EXAMPLES

The following Examples demonstrate the present invention. Examples are intended to illustrate the present invention and not to limit the present invention.

Synthesis Example 1

To a thin film flow-down-type reactor, continuously supplied were 2.0% by volume of sulfur trioxide gas and a higher alcohol (molecular weight: 189) having an alkyl group of 12 carbon atoms at 60° C. to react them. Flow rates were such controlled as that a molar ratio in reaction of the sulfur trioxide gas to the higher alcohol was 0.96. The sulfated product was neutralized with 23% sodium hydroxide aqueous solution. To this was added 30% phosphate buffer to adjust finely pH to 8, and was further added water to adjust an anion active matter of the anion surfactant to 22.2 to 75.3% to give an aqueous solution of sodium alkylsulfate. An amount of petroleum ether-soluble matters in the resultant aqueous solution of sodium alkylsulfate was 0.49 to 1.12%.

Example 1

In a 2500 L vacuum dryer (manufactured by Fukae Powtec Co., Ltd., trade name: high speed mixer model FMD-1200JE), 130 kg of sodium alkylsulfate powder (EMAL 0: manufactured by Kao Corporation, average particle diameter: 0.03 mm) was agitated with a rotation number of an agitating blade of 70 rpm and heated to rise a powder temperature to 36° C. by flowing hot water of 65° C. in a jacket. Then, to the dryer was supplied 1877 kg of aqueous solution of sodium alkylsulfate heated to 40° C., in which an anion active matter was 22.2% by weight and an amount of petroleum ether-soluble matters was 0.54%, over 27.6 hours with keeping a temperature of dry product to 35.5±2° C. under drying and granulating conditions of a jacket temperature of 65° C., an internal pressure of the machine of 4.0 kPa, a rotation number of the agitating blade of 70 rpm and a rotation number of a crushing blade of 2000 rpm, thereby drying and granulating were simultaneously performed. A weight of the resultant sodium alkylsulfate granules was 530 kg including 130 kg of powder initially added.

An average particle diameter of the resultant granules was 0.78 mm, an amount of petroleum ether-soluble matters was 1.55% by weight, and a water content was 1.78% by weight. A removal rate of petroleum ether-soluble matters from the granules was 21.6% by weight according to the following formula.

removal rate of petroleum ether-soluble matters (% by weight)=$(1-a2/a1)\times100$ $a1$(% by weight)=$(A_{10}+A_{11})/(W_{10}+W_{11})\times100$ wherein $W_{10}$: weight of anion active matter in an alkyl sulfate powder initially added (kg)

$A_{10}$: weight of petroleum ether-soluble matters in an alkyl sulfate powder initially added (kg)

$W_{11}$: weight of anion active matter in an aqueous solution of sodium alkylsulfate added (kg)

$A_{11}$: weight of petroleum ether-soluble matters in an aqueous solution of sodium alkylsulfate added (kg)

a2: an amount of petroleum ether-soluble matters to an anion active matter in dried granules (% by weight)

In the present specification, a water content is a value measured by the Karl-Fisher method (JIS K 0068).

Example 2

It was similarly performed as in Example 1, except that an aqueous solution of sodium alkylsulfate supplied to a dryer was 1648 kg of aqueous solution of sodium alkylsulfate, in which an anion active matter was 25.8% by weight and an amount of petroleum ether-soluble matters was 0.58%, and a supplying time was 21.2 hours. 526 kg of sodium alkylsulfate granules was obtained.

An average particle diameter of the resultant granules was 0.75 mm, an amount of petroleum ether-soluble matters was 1.40% by weight, and a water content was 1.7% by weight. A removal rate of petroleum ether-soluble matters from the granules was 20.3% by weight.

Example 3

It was similarly performed as in Example 1, except that an aqueous solution of sodium alkylsulfate supplied to a dryer was 1375 kg of aqueous solution of sodium alkylsulfate, in which an anion active matter was 29.6% by weight and an amount of petroleum ether-soluble matters was 0.49%, and a supplying time was 14.7 hours. 510 kg of sodium alkylsulfate granules was obtained.

An average particle diameter of the resultant granules was 0.84 mm, an amount of petroleum ether-soluble matters was 1.04% by weight, and a water content was 1.79% by weight. A removal rate of petroleum ether-soluble matters from the granules was 14.6% by weight.

Example 4

A 2500 L vacuum dryer (manufactured by Fukae Powtec Co., Ltd., trade name: high speed mixer model FMD-1200JE) was run without adding a powder at a rotation number of an agitating blade of 70 rpm and heated to rise an inner temperature of the dryer to 38° C. by flowing hot water of 65° C. in a jacket. Then, to the dryer was supplied 2118 kg of aqueous solution of sodium alkylsulfate heated to 40° C., in which an anion active matter was 30.4% by weight and an amount of petroleum ether-soluble matters was 0.70%, over 33.7 hours with keeping a temperature of dry product to 38.0±2° C. under drying and granulating conditions of a jacket temperature of 65° C., an internal pressure of the machine of 5.3 kPa, a rotation number of the agitating blade of 70 rpm and a rotation number of a crushing blade of 2000 rpm, thereby drying and granulating were simultaneously performed. A weight of the resultant sodium alkylsulfate granules was 619 kg.

An average particle diameter of the resultant granule was 0.88 mm, an amount of petroleum ether-soluble matters was 1.65% by weight, and a water content was 1.19% by weight. A removal rate of petroleum ether-soluble matters from the granule was 25.8% by weight.

Example 5

In a 65 L vacuum dryer (manufactured by Fukae Powtec Co., Ltd., trade name: high speed mixer model FMD-65J), 5.0 kg of sodium alkylsulfate powder (EMAL 0: manufactured by Kao Corporation, average particle diameter: 0.03 min) was agitated with a rotation number of an agitating blade of 200 rpm and heated to rise a powder temperature to 36° C. by flowing hot water of 65° C. in a jacket. Then, to the dryer was supplied 18.5 kg of aqueous solution of sodium alkylsulfate heated to 40° C., in which an anion active matter was 5.0% by weight and an amount of petroleum ether-soluble matters was 0.13%, over 4.0 hours with keeping a temperature of dry product to 36±2° C. under drying and granulating conditions of a jacket temperature of 65° C., an internal pressure of the machine of 5.3 kPa, a rotation number of the agitating blade of 200 rpm and a rotation number of a crushing blade of 3000 rpm, thereby drying and granulating were simultaneously performed. A weight of the resultant sodium alkylsulfate granules was 5.4 kg including 5.0 kg of powder initially added.

An average particle diameter of the resultant granule was 1.02 mm, an amount of petroleum ether-soluble matters was 0.17% by weight, and a water content was 2.56% by weight. A removal rate of petroleum ether-soluble matters from the granules was 62.1% by weight.

Comparative Example 1

It was similarly performed as in Example 1, except that an aqueous solution of sodium alkylsulfate supplied to a dryer was 680 kg of aqueous solution of sodium alkylsulfate, in which an anion active matter was 75.3% by weight and an amount of petroleum ether-soluble matters was 0.59%, and a supplying time was 3.6 hours. 621 kg of sodium alkylsulfate granule was obtained.

An average particle diameter of the resultant granule was 0.62 mm, an amount of petroleum ether-soluble matters was 0.73% by weight, and a water content was 1.4% by weight. A removal rate of petroleum ether-soluble matters from the granules was 4.6% by weight.

Comparative Example 2

It was similarly performed as in Example 1, except that an aqueous solution of sodium alkylsulfate supplied to a dryer was 700 kg of aqueous solution of sodium alkylsulfate, in which an anion active matter was 73.6% by weight and an amount of petroleum ether-soluble matters was 1.12%, and a supplying time was 3.0 hours. 613 kg of sodium alkylsulfate granules was obtained.

An average particle diameter of the resultant granule was 1.02 mm, an amount of petroleum ether-soluble matters was 1.35% by weight, and a water content was 1.41% by weight. A removal rate of petroleum ether-soluble matters from the granule was 3.0% by weight.

TABLE 1

|  |  | Example | | | | | Comparative example | |
|---|---|---|---|---|---|---|---|---|
|  |  | 1 | 2 | 3 | 4 | 5 | 1 | 2 |
| Dryer | | | | | | | | |
| Powder temperature in dryer | ° C. | 36 | 36 | 36 | 38 | 36 | 51 | 47 |
| Internal pressure in dryer | kPa | 4.0 | 4.0 | 4.0 | 5.3 | 5.3 | 4.0 | 5.3 |
| Rotation number of agitation blade | rpm | 70 | 70 | 70 | 70 | 200 | 70 | 70 |
| Froude number of agitation blade | — | 2.3 | 2.3 | 2.3 | 2.3 | 3.3 | 2.3 | 2.3 |
| Rotation number of crushing blade | rpm | 2000 | 2000 | 2000 | 2000 | 3000 | 2000 | 2000 |
| Jacket temperature | ° C. | 65 | 65 | 65 | 65 | 65 | 65 | 65 |
| Anion surfactant powder unitially added | | | | | | | | |
| Amount of powder initially added | kg | 130 | 130 | 130 | 0 | 5.0 | 130 | 130 |
| Anion Active Matter | % by weight | 98.1 | 99.6 | 99.9 | 0 | 99.9 | 97.4 | 96.8 |
| Amount of petroleum ether-soluble matters(residual extract) | % by weight | 0.85 | 0.37 | 0.04 | 0.00 | 0.06 | 0.72 | 1.10 |
| Aqueous solution of anion surfactant | | | | | | | | |
| Anion Active Matter | % by weight | 22.2 | 25.8 | 29.6 | 30.4 | 5.0 | 75.3 | 73.6 |
| Amount of petroleum ether-soluble matters | % by weight | 0.54 | 0.58 | 0.49 | 0.70 | 0.13 | 0.59 | 1.12 |
| Added amount | kg | 1877 | 1648 | 1375 | 2118 | 18.5 | 680 | 700 |
| Added time | hr | 27.6 | 21.2 | 14.7 | 33.7 | 4.0 | 3.6 | 3.0 |
| Adding rate per dryer volume | kg/hr · m³ | 27 | 31 | 37 | 25 | 71 | 76 | 93 |
| Anion surfactant granules | | | | | | | | |
| Anion Active Matter | % by weight | 96.3 | 96.3 | 96.3 | 96.6 | 98.2 | 98.2 | 96.4 |
| water content | % by weight | 1.78 | 1.70 | 1.79 | 1.19 | 2.56 | 1.40 | 1.41 |
| Average particle diameter | mm | 0.78 | 0.75 | 0.84 | 0.88 | 1.02 | 0.62 | 1.02 |
| Granular product amount | kg | 530 | 526 | 510 | 619 | 5.4 | 621 | 613 |
| Amount of petroleum ether-soluble matters(residual extract) | % by weight | 1.55 | 1.40 | 1.04 | 1.65 | 0.17 | 0.73 | 1.35 |
| Removal rate of petroleum ether-soluble matters | % by weight | 21.6 | 20.3 | 14.6 | 25.8 | 62.1 | 4.6 | 3.0 |

The invention claimed is:

1. A method for producing anion surfactant granules, comprising steps of: adding an aqueous solution of an anion surfactant whose anion surfactant concentration is 5 to 35% by weight at a reduced pressure to a granulator or dryer having an agitating blade; and granulating and drying the aqueous solution;
   wherein granulating and drying are performed at a temperature of the anion surfactant granule in the granulator or dryer within the range of 5 to 60° C.;
   wherein an internal pressure of the granulator or dryer is 0.5 to 20 kPa;
   wherein the anion surfactant is an alkylsulfate salt;
   wherein an adding rate of the aqueous solution of an anion surfactant is 10 to 100 kg/Hr per 1 m³ of the volume of the granulator or dryer; and
   wherein an average particle diameter of the anion surfactant granules obtained is not less than 0.2 mm and not more than 2.5 mm.

2. The method for producing anion surfactant granules according to claim 1, wherein an anion surfactant powder is present in the granulator or dryer in advance to the addition of the aqueous solution of an anion surfactant.

3. The method for producing anion surfactant granules according to claim 1, wherein the granulator or dryer provided with an agitating blade further comprises a crushing blade.

4. The method for producing anion surfactant granules according to claim 1, wherein the agitating blade of the granulator or dryer has a Froude number defined by the following formula of not less than 0.3 and not more than 5.0:

$$Fr = V/[(R \times g)^{0.5}]$$

wherein Fr represents the Froude number; V represents a peripheral velocity of the agitating blade at the tip in m/s; R represents a radius of rotation in m of the agitating blade; and g represents the gravitational acceleration in m/s².

5. The method for producing anion surfactant granules according to claim 1, wherein the anion surfactant is a sodium alkylsulfate.

6. A method for removing petroleum ether-soluble matters from an alkylsulfate salt, comprising the steps of:
   adding an aqueous solution of an alkylsulfate salt whose alkylsulfate salt concentration is 5 to 35% by weight at a reduced pressure to a granulator or dryer having an agitating blade; and
   granulating and drying the aqueous solution;
   wherein an internal pressure of the granulator or dryer is 0.5 to 20 kPa;
   wherein an adding rate of the aqueous solution of an alkylsulfate salt is 10 to 100 kg/Hr per 1 m³ of the volume of the granulator or dryer;
   wherein granulating and drying are performed at a temperature of the alkylsulfate salt granule in the granulator or dryer within the range of 5 to 60° C.

7. The method according to claim 6, wherein an alkylsulfate salt powder is present in the granulator or dryer in advance to the addition of the aqueous solution of an alkylsulfate salt.

8. The method according to claim 6, wherein the granulator or dryer provided with an agitating blade further comprises a crushing blade.

9. The method according to claim 6, wherein an average particle diameter of the alkylsulfate salt granules obtained is not less than 0.2 mm and not more than 2.5 mm.

10. The method according to claim 6, wherein the agitating blade of the granulator or dryer has a Froude number defined by the following formula of not less than 0.3 and not more than 5.0:

$$Fr = V/[(R \times g)^{0.5}]$$

wherein Fr represents the Froude number; V represents a peripheral velocity of the agitating blade at the tip in m/s; R represents a radius of rotation in m of the agitating blade; and g represents the gravitational acceleration in m/s$^2$.

11. The method according to claim 6, wherein the alkylsulfate salt is a sodium alkylsulfate.

* * * * *